United States Patent
Zhou et al.

(10) Patent No.: US 10,777,806 B2
(45) Date of Patent: Sep. 15, 2020

(54) ENERGY STORAGE DEVICES INCLUDING AT LEAST ONE ELECTRODE COMPRISING A METAL DIBORIDE, AND RELATED METHODS

(71) Applicants: Baker Hughes, a GE company, LLC, Houston, TX (US); William Marsh Rice University, Houston, TX (US)

(72) Inventors: Zhou Zhou, Houston, TX (US); Keiko Kato, Yomogidai (JP); Ganguli Babu, Houston, TX (US); Valery N. Khabashesku, Houston, TX (US); Pulickel M. Ajayan, Houston, TX (US)

(73) Assignees: Baker Hughes, a GE company, LLC, Houston, TX (US); William Marsh Rice University, Houston, TX (US)

( * ) Notice: Subject to any disclaimer, the term of this patent is extended or adjusted under 35 U.S.C. 154(b) by 177 days.

(21) Appl. No.: 15/940,527

(22) Filed: Mar. 29, 2018

(65) Prior Publication Data

US 2019/0305297 A1 Oct. 3, 2019

(51) Int. Cl.
 *H01M 4/136* (2010.01)
 *H01M 4/1397* (2010.01)
 (Continued)

(52) U.S. Cl.
 CPC .......... *H01M 4/136* (2013.01); *H01G 11/50* (2013.01); *H01G 11/52* (2013.01); *H01G 11/56* (2013.01);
 (Continued)

(58) Field of Classification Search
 CPC .......... H01M 10/0525; H01M 10/054; H01M 2004/027; H01M 4/136; H01M 4/1397; H01M 4/364; H01M 4/58; H01M 4/587
 See application file for complete search history.

(56) References Cited

U.S. PATENT DOCUMENTS

| 4,492,670 A | 1/1985 | Mizrah et al. |
| 4,650,731 A * | 3/1987 | Hoffman ................. H01M 6/16 |
| | | 423/297 |

(Continued)

FOREIGN PATENT DOCUMENTS

| CN | 101310398 A | 2/2014 |
| JP | 2008153122 A * | 7/2008 |
| WO | 01/93363 A2 | 12/2001 |

OTHER PUBLICATIONS

I.-S. Kim, G.E. Blomgren, P.N. Kumta. Nanostructured Si/TiB2 Composite Anodes for Li-Ion Batteries, Electrochemical and Solid-State Letters, 6(8) A157-A161 (2003).*

(Continued)

*Primary Examiner* — Carlos Barcena
(74) *Attorney, Agent, or Firm* — TraskBritt

(57) ABSTRACT

An energy storage device including a first electrode comprising lithium, a second electrode comprising a metal diboride, an electrolyte disposed between the first electrode and the second electrode and providing a conductive pathway for lithium ions to move to and from the first electrode and the second electrode, and a separator within the electrolyte and between the first electrode and the second electrode. A method of forming an energy storage device including forming a first electrode to include lithium, forming a second electrode to include a metal diboride, disposing an electrolyte between the first electrode and the second electrode, the electrolyte providing a conductive pathway for lithium ions to move to and from the first electrode and the second electrode, and disposing a separator within the electrolyte and between the first electrode and the second electrode.

18 Claims, 5 Drawing Sheets

(51) Int. Cl.
| | |
|---|---|
| *H01M 10/0525* | (2010.01) |
| *H01G 11/50* | (2013.01) |
| *H01G 11/56* | (2013.01) |
| *H01G 11/62* | (2013.01) |
| *H01G 11/60* | (2013.01) |
| *H01G 11/86* | (2013.01) |
| *H01G 11/52* | (2013.01) |
| *H01M 4/02* | (2006.01) |

(52) U.S. Cl.
CPC ............. *H01G 11/60* (2013.01); *H01G 11/62* (2013.01); *H01G 11/86* (2013.01); *H01M 4/1397* (2013.01); *H01M 10/0525* (2013.01); *H01M 2004/027* (2013.01)

(56) References Cited

U.S. PATENT DOCUMENTS

| | | | |
|---|---|---|---|
| 5,948,558 | A | 9/1999 | Amendola |
| 6,395,427 | B1 | 5/2002 | Sheem et al. |
| 6,468,694 | B1 | 10/2002 | Amendola |
| 7,817,403 | B2 | 10/2010 | Tasaki et al. |
| 9,129,756 | B2 | 9/2015 | Gadkaree et al. |
| 2012/0208092 | A1 | 8/2012 | Ku et al. |
| 2012/0308872 | A1 | 12/2012 | Huang |
| 2014/0050947 | A1 | 2/2014 | Donnelly |

OTHER PUBLICATIONS

Y. Liu, K. Hanai, T. Matsumura, N. Imanishi, A. Hirano, Y. Takeda. Novel Composites Based on Ultrafine Silicon, Carbonaceous Matrix, and the Introduced Co-Milling Components as Anode Host Materials for Li-Ion Batteries, Electrochemical and Solid-State Letters, 7(12) A492-A495 (2004).*

X. Zhang, X.-G. Wang, Z. Xie, Z. Zhou. Recent progress in rechargeable alkali metaleair batteries, Green Energy & Environment 1 (2016) 4-17.*

Heidari, H. et al., 'Investigating the potential of TiB2-based composites w ith Ti and Fe additives as wettable cathode', Advanced Materials Research , vol. 409, (2012), pp. 195-200, See abstract; and pp. 196, 200.

International Search Report for International Application No. PCT/US2019/024639 dated Jul. 11, 2019, 3 pages.

International Written Opinion for International Application No. PCT/US2019/024639 dated Jul. 11, 2019, 6 pages.

Basu et al., Processing and Properties of Monolithic TiB2 Based Materials, Internation Materials Reviews, vol. 51, No. 6, (2006), pp. 352-374.

Dewing, Ernest W., The Solubility of Titanium Diboride in Aluminum, Metallurgical Transactions A, vol. 20A, (Oct. 1989), pp. 2185-2187.

Dionne et al., Microscopic Characterization of a TiB2-Carbon Material Composite: Raw Materials and Composite Characterization, Metallurgical and Materials Transactions A, vol. 32A, (Oct. 2001), pp. 2649-2656.

Ettmayer et al., Ti(C,N) Cermets—Metallurgy and Properties, Int. J. of Refractory Metals & Hard Materials, No. 13, (1995), pp. 343-351.

Giampaolo et al., Tool-Life Reliability of Cermet Inserts in Milling Tests, Journal of Materials Processing Technology, vol. 77, (1998), pp. 337-343.

McLeod et al., Electrical Resistivities of Monocrystalline and Polycrystalline TiB2, Jounal of the American Ceramic Society, vol. 67, No. 11, (Nov. 1984), pp. 705-708.

Niozari et al., Synthesis and Characterization of Nano-Structured TiB2, Processed by Milling Assisted SHS Route, Materials Characterization, vol. 73, (2012), pp. 96-103.

Rachavan et al., Electrical Properties of Radom Checkerboards at Finite Scales, AIP Advances, vol. 5, (2015), 017131-1-017131-12.

Watson et al., The Wettability of Carbon/TiB2 Composite Materials by Aluminum in Cryolite Melts, Metallurgical Transactions B, vol. 22B, (Oct. 1991), pp. 617-618.

* cited by examiner

ENERGY STORAGE DEVICES INCLUDING AT LEAST ONE ELECTRODE COMPRISING A METAL DIBORIDE, AND RELATED METHODS

TECHNICAL FIELD

This disclosure relates generally to energy storage devices. In particular, this disclosure relates to lithium-ion batteries, lithium-ion capacitors, and lithium-sulfur batteries and methods of making the foregoing.

BACKGROUND

Lithium-ion batteries are utilized in an array of portable electronic devices due to lithium-ion batteries' energy densities compared to the other rechargeable batteries (i.e., lead acid batteries and nickel metal hydride batteries). However, power density of lithium-ion batteries is relatively low due to relatively slow lithium-ion intercalation processes in conventional anode materials (i.e., graphite). Due to the low lithium-ion intercalation potential (~0.05 V) of graphite, the anode typically forms a passivation layer called a solid electrolyte interphase ("SEI"). Furthermore, slow lithium-ion conduction across the SEI lowers usable capacity of the lithium-ion battery when the lithium-ion batteries are charged and/or discharged relatively quickly.

Beyond conventional lithium-ion batteries, lithium-sulfur (Li—S) batteries are promising due to Li—S batteries' high theoretical energy density, low cost, safety, and inoffensive nature with applications of electric-based transportation and other emerging applications. However, practical applications of Li—S batteries are impeded due to the short cycle life and poor coulombic efficiency. These poor performances generally result from an electrically insulating nature of sulfur and a shuttling effect of dissolved lithium polysulfide (LiPS) species, which interferes with reactive lithium metal anodes.

BRIEF SUMMARY

Some embodiments of the present disclosure include an energy storage device. The energy storage device may include a first electrode comprising lithium, a second electrode comprising a metal diboride, an electrolyte disposed between the first electrode and the second electrode and providing a conductive pathway for lithium ions to move to and from the first electrode and the second electrode, and a separator within the electrolyte and between the first electrode and the second electrode.

In additional embodiments, the present disclosure includes an energy storage device. The energy storage device may include a first electrode, a second electrode comprising a metal diboride, an electrolyte disposed between the first electrode and the second electrode and providing a conductive pathway for ions to move to and from the first electrode and the second electrode, and a separator within the electrolyte and between the first electrode and the second electrode.

Some embodiments of the present disclosure include a method of forming an energy storage device. The method may include forming a first electrode to comprise lithium; forming a second electrode to comprise a metal diboride; disposing an electrolyte between the first electrode and the second electrode, the electrolyte providing a conductive pathway for lithium ions to move to and from the first electrode and the second electrode; and disposing a separator within the electrolyte and between the first electrode and the second electrode.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein.

DETAILED DESCRIPTION

Figure 1A:
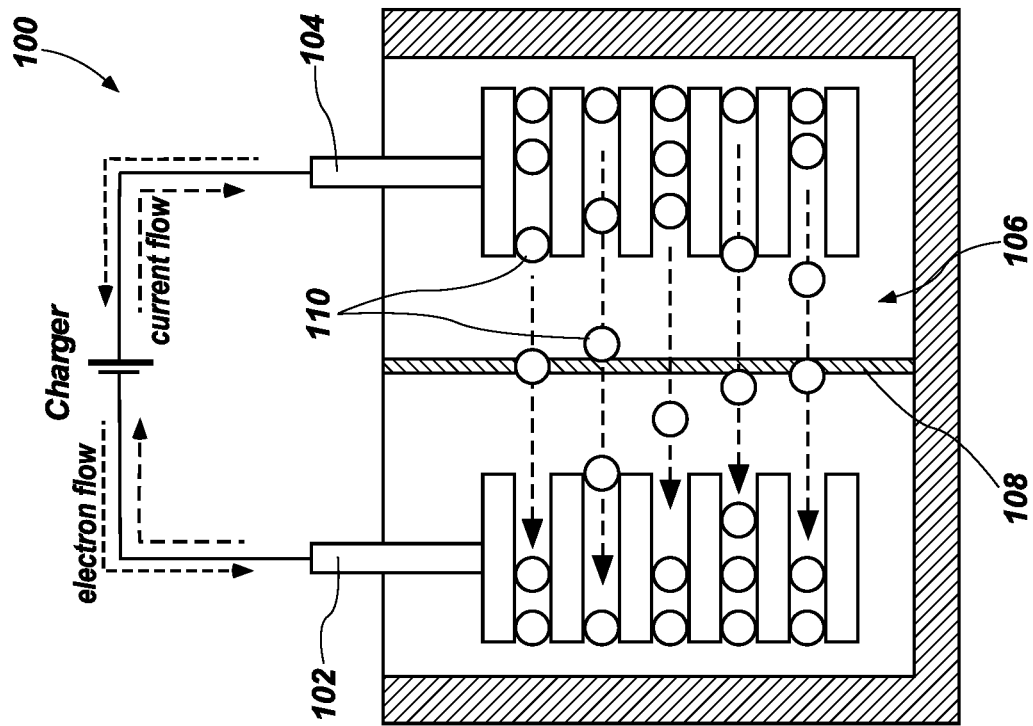
FIG. 1A shows a schematic representation of an energy storage device in a discharging state according to one or more embodiments of the present disclosure.

The illustrations presented herein are not actual views of any lithium-ion battery, lithium-ion capacitor, lithium sulfur battery, or any component thereof, but are merely idealized representations, which are employed to describe embodiments of the present invention.

As used herein, the singular forms following "a," "an," and "the" are intended to include the plural forms as well, unless the context clearly indicates otherwise.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, any relational term, such as "first," "second," etc., is used for clarity and convenience in understanding the disclosure and accompanying drawings, and does not connote or depend on any specific preference or order, except where the context clearly indicates otherwise. Furthermore, these terms may refer to an orientation of elements of a lithium battery when disposed as illustrated in the drawings.

As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.).

Some embodiments of the present disclosure include an energy storage device. In one or more embodiments, the energy storage device may include at least one electrode (e.g., anode or cathode) including a metal diboride (e.g., $TiB_2$) or one of its transition metal derivatives. For instance the at least one electrode may include $MB_xO_y$, where M=Ti, Zr, Mg, Si, Mo, W, V, Mn; x=1 to 2 and y=0 to 1. For instance, in one non-limiting example, the at least one electrode may include $TiB_2$.

In some embodiments, the at least one electrode including a metal diboride or one of its transition metal derivatives may exhibit a relatively high electronic conductivity in comparison to conventional electrodes (e.g., a graphite electrode). For example, in some embodiments, the at least one electrode may exhibit a conductivity within a range of about $6.667 \times 10^6$ S/m to about $1.11 \times 10^7$ S/m. Additionally, due to the at least one electrode, the energy storage device may exhibit a lithium intercalation potential above anodic electrolyte decomposite potential (~0.7 V). For instance, the energy storage device of the present disclosure may exhibit a lithium intercalation potential above 0.7 V.

Thus, the metal diboride anode of the energy storage device of the present disclosure avoids formation of the solid electrolyte interphase ("SEI"). As a result, the energy storage device of the present disclosure at least substantially maintains its usable capacity even when charged and/or discharged quickly. Accordingly, as will be understood by one of ordinary skill in the art, by maintaining its usable capacity even when charged and/or discharged quickly, the energy storage device of the present disclosure may provide a more reliable energy source in comparison to conventional lithium-ion batteries, which, in turn, may provide more reliable and safe operations when utilizing the energy source.

Additionally, in some embodiments, the energy storage device exhibits a capacity (e.g., specific energy, energy density) within a range of about 110 mAh/g to about 120 mAh/g at zero cycles. Furthermore, at room temperature (~20° C.) over about 100 cycles, the energy storage device exhibits a drop in capacity of between about 15% and about 25%. For instance, at room temperature, the energy storage device may exhibit a loss in capacity of about 18%. Furthermore, at about 90° C. and over about twenty-five cycles, the energy storage device exhibits a capacity between about 85 mAh/g and about 65 mAh/g. Additionally, at about 90° C., the energy storage device may exhibit a loss in capacity of between about 18% and about 25% over about twenty-five cycles. For instance, at about 90° C., the energy storage device may exhibit a loss in capacity of about 21%. Accordingly, the energy storage device of the present disclosure may exhibit a relatively high temperature stability (in regard to capacity) and a relatively high pressure stability in comparison to conventional energy storage devices. Additionally, as will be understood in the art, the at least one electrode of the present disclosure may exhibit relatively high levels of corrosion/erosion resistance in comparison to conventional electrodes (e.g., graphite electrodes).

Furthermore, because the energy storage devices of the present disclosure include a metal diboride anode, the energy storage devices can provide a high energy density at high power densities (e.g., fast charging). Accordingly, the energy storage devices may provide more suitable energy sources for consumer electronics, medical devices, and military devices, where energy storage devices are required to operate at high current rates.

Figure 1B:
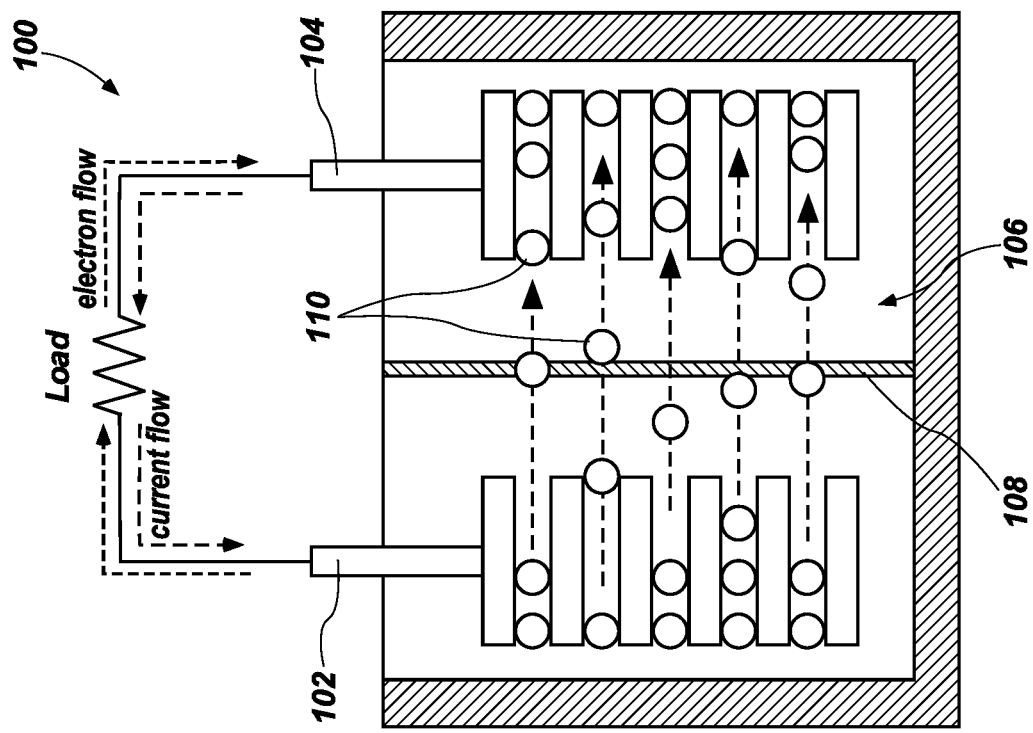
FIG. 1B shows a schematic representation of an energy storage device in a charging state according to one or more embodiments of the present disclosure.

FIG. 1A shows a schematic representation of an energy storage device 100 in a discharging state according to one or more embodiments of the present disclosure. FIG. 1B shows a schematic representation of the energy storage device 100 of FIG. 1A in a charging state according to one or more embodiments of the present disclosure. Referring to FIGS. 1A and 1B together, in one or more embodiments, the energy storage device 100 may include an anode 102 (e.g., negative electrode), a cathode 104 (e.g., positive electrode), an electrolyte 106, and a separator 108.

In some embodiments, the energy storage device 100 may include a lithium-ion storage device. For instance, as will be understood by one of ordinary skill in the art, the energy storage device 100 may include a type of rechargeable battery in which lithium ions 110 move from the anode 102 to the cathode 104 during a discharging state and from the cathode 104 to the anode 102 during a charging state. As is described in greater detail below, the energy storage device 100 may utilize an intercalated lithium compound as at least part of the cathode 104. The anode 102 and the cathode 104 of the energy storage device 100 allow lithium ions 110 to move into the structures of the anode 102 and cathode 104 via insertion (i.e., intercalation) and out of the structures of the anode 102 and cathode 104 with a process via extraction (deintercalation).

During discharge, the (positive) lithium ions 110 move from the anode 102 to the cathode 104 (forming a lithium compound) through the electrolyte 106. When the energy storage device 100 is charging, the reverse occurs with the lithium ions 110 and electrons moving back into the anode 102 in a net higher energy state. The lithium ions 110 are transported to and from the cathode 104 and anode 102 by oxidizing a transition metal, as is known in the art.

In some embodiments, the anode 102 of the energy storage device 100 may include a metal diboride and/or any of its derivatives (e.g., partial oxidation phases). For example, in one or more embodiments, the anode 102 of the energy storage device 100 may include $MB_xO_y$, where M=Ti, Zr, Mg, Si, Mo, W, V, Mn; x=1 to 2 and y=0 to 1. As a non-limiting example, the anode 102 may include $TiB_2$. In order to facilitate explanation of the energy storage device 100, the anode 102 is described herein as including a metal diboride; however, it is understood that the term "metal diboride" includes any of the foregoing described materials, metal diborides, and/or derivatives of metal diborides.

In one or more embodiments, the anode 102 may include metal diboride (e.g., $TiB_2$) nanoparticles. For example, in some embodiments, the anode 102 may include particles of metal diboride having one, two, or three dimensions (e.g., grain size) between 20 nm and 100 nm. For instance, the anode 102 may include particles of metal diboride having one, two, or three dimensions between 30 nm and 60 nm. In additional embodiments, the anode 102 may include particles of metal diboride having one, two, or three dimensions between 40 nm and 50 nm. In some instances, the grain size of the metal diboride nanoparticles may be optimized to optimize performance of the energy storage device 100. In additional embodiments, the anode 102 may include one or more of nanotubes, nanosheets, and quantum dots of metal diboride. In further embodiments, the anode 102 may include metal diboride microparticles in combination with metal diboride nanoparticles. As is described in greater detail in regard to FIG. 2, the nanoparticles of metal diboride, in comparison to bulk forms of metal diboride (i.e., forms of metal diboride not confined to a nanoscale in any dimension), significantly outperform the bulk forms in regard to capacity and charging/discharging rates of the energy storage device 100.

Additionally, the metal diboride nanoparticles may be formed via any synthesis methods known in the art. For instance, the metal diboride nanoparticles may be derived from larger molecules, or synthesized by "bottom-up" methods that, for example, nucleate particles from fine molecular distributions in liquid of vapor phase. Additionally, the metal diboride nanoparticles may be created via one or more synthesis methods including: gas condensation, attrition, chemical precipitation, ion implantation, pyrolysis, and hydrothermal synthesis.

In some embodiments, the anode 102 may include a composite of metal diboride(s) and other materials. For instance, the anode 102 may include a composite of metal diboride and graphite. As another non-limiting example, the anode 102 may include a composite of metal diboride and any high surface area carbons, such as carbon nanotubes, carbon fiber, carbon paper, graphene, etc. In some embodiments, the composite of the anode 102 may include between about 90% and about 30% metal diboride by mass. In additional embodiments, the composite of the anode 102 may include between about 80% and about 50% metal diboride by mass. In further embodiments, the composite of the anode 102 may include between about 80% and about 60% metal diboride by mass. In alternative embodiments, the anode 102 of the energy storage device 100 may include at least substantially entirely one or more metal diborides.

Utilizing an anode 102 comprising a metal diboride in the energy storage device 100 may provide an anode 102 being a more mechanically strong in comparison to conventional anodes (e.g., graphite anodes). For instance, the anode 102 of the present disclosure may have a relatively high hardness in comparison to conventional anodes. For example, in some embodiments, the anode 102 may exhibit a hardness within a range of about a 2500 Knoop hardness to about a 2700 Knoop hardness at room temperature (20° C.). In additional embodiments, the anode 102 may exhibit a hardness within a range of about 2550 Knoop hardness to about a 2650 Knoop hardness at room temperature (20° C.). For instance, the anode 102 may exhibit a hardness of about a 2600 Knoop hardness.

Additionally, the metal diboride anode 102 may exhibit relatively high electronic conductivity in comparison to conventional anodes (e.g., a graphite anode 102). For example, in some embodiments, the metal diboride anode 102 may exhibit a conductivity within a range of about $6.667 \times 10^6$ S/m to about $1.11 \times 10^7$ S/m while a conventional graphite anode 102 exhibits a conductivity within a range of about $3.3 \times 10^2$ S/m (⊥basal plane) to about $2.0 \times 10^5$ S/m (//basal plane). In additional embodiments, the metal diboride anode 102 may exhibit a conductivity within a range of about $8.0 \times 10^6$ S/m to about $1.11 \times 10^7$ S/m. In further embodiments, the metal diboride anode 102 may exhibit a conductivity within a range of about $10.0 \times 10^6$ S/m to about $1.11 \times 10^7$ S/m.

Furthermore, as will be understood by one of ordinary skill in the art, the metal diborides described above and utilized within the anode 102 of the energy storage device 100 may be at least substantially chemically inert. Furthermore, the anode 102 may be mechanically stable under critical conditions such as high pressure and high temperature. Moreover, the anode 102 is environmentally friendly (i.e., non-hazardous). Also, the anode 102 may be scaled up in production industrially. Likewise, the anode 102 may have a relatively low cost to produce.

Moreover, as is discussed in greater detail below in regard to FIG. 3, the anode 102 of the present disclosure may enable an energy storage device 100 to have a relatively high temperature stability (in regard to specific energy density) and a relatively high pressure stability in comparison to conventional anodes. Additionally, as will be understood in the art, the anode 102 of the present disclosure may exhibit relatively high levels of corrosion/erosion resistance in comparison to conventional energy storage devices.

Referring still to FIGS. 1A and 1B together, in some embodiments, the cathode 104 of the energy storage device 100 may include one or more of a layered oxide, a polyanion, or a spinel. As non-limiting examples, the cathode 104 may include lithium cobalt oxide ($LiCoO_2$), lithium iron phosphate ($LiFePO_4$), lithium ion manganese oxide ($LiMn_2O_4$, $Li_2MnO_3$, or LMO), lithium nickel manganese cobalt oxide ($LiNiMnCoO_2$ or NMC), lithium nickel cobalt aluminum oxide ($LiNiCoAlO_2$ or NCA), and/or emerging Li-excess metal oxide materials ($Li_xMO_2$ where <x<, M=Ni, Co, Mo, Nb, Ti, etc.). Additionally, the cathode 104 may include any lithium-based cathodes known in the art. Furthermore, although the cathode 104 is described herein as being lithium-based, the disclosure is not so limited. Rather, the cathode 104 may include any cathodes known in the art for alkaline-ion storage devices (e.g., sodium (Na), magnesium (Mg), calcium (Ca), etc., based cathodes).

The electrolyte 106 may include one or more of a liquid electrolyte 106 and a solid electrolyte 106. In some embodiments, the electrolyte 106 may include a mixture of organic carbonates such as ethylene carbonate or diethyl carbonate containing complexes of lithium ions 110. When the electrolyte 106 includes a liquid electrolyte 106, the electrolyte 106 may include lithium salts, such as $LiPF_6$, $LiBF_4$ or $LiClO_4$ in an organic solvent, such as ethylene carbonate, dimethyl carbonate, and diethyl carbonate. These electrolytes may include non-coordinating anion salts such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), and lithium triflate ($LiCF_3SO_3$). In additional embodiments, the electrolyte 106 may include composite electrolytes based on POE (poly (oxyethylene)), PVDF, PEO-PTFE, PEO-polyimide, ceramic (LiPON, sulfide glass, phosphate ceramic materials). Additionally, the electrolytes may include ionic liquid. As is known in the art, the liquid electrolyte 106 may act as a conductive pathway for the movement of cations passing from the anode 102 to the cathode 104 during discharge.

When the electrolyte 106 comprises a solid electrolyte 106, the electrolyte 106 may include solid ceramic electrolytes such as lithium metal oxides that allow lithium ion transport through the solid electrolyte 106 more readily due to the intrinsic lithium. As is known in the art, electrolytes that are solid reduce a risk of leaks. Solid ceramic electrolytes may include highly ordered compounds with crystal structures having ion transport channels. For instance, the ceramic electrolyte 106 may include lithium super ion conductors (LISICON) and perovskites. In additional embodiments, the solid ceramic electrolyte 106 may include amorphous atomic structures having higher conductivities overall due to higher conductivity at grain boundaries.

In one or more embodiments, the separator 108 may include a permeable membrane disposed between the anode 102 and cathode 104 of the energy storage device 100. The separator 108 may prevent electrical short circuits while also allowing transport of ions therethrough. In some embodiments, the separator 108 includes a polymeric membrane forming a microporous layer. In some embodiments, the separator 108 may include one or more of nonwoven fibers (e.g., cotton, nylon, polyesters, glass), polymer films (e.g., polyethylene, polypropylene, poly (tetrafluoroethylene), polyvinyl chloride), ceramics, and naturally occurring substances (rubber, asbestos, wood).

As is discussed in greater detail below, due to the presence of metal diboride anode 102, the energy storage device 100 of the present disclosure may exhibit a lithium intercalation potential above anodic electrolyte decomposite potential (~0.7 V). For instance, the energy storage device 100 of the present disclosure may exhibit a lithium intercalation potential above 0.7 V.

Figure 2:
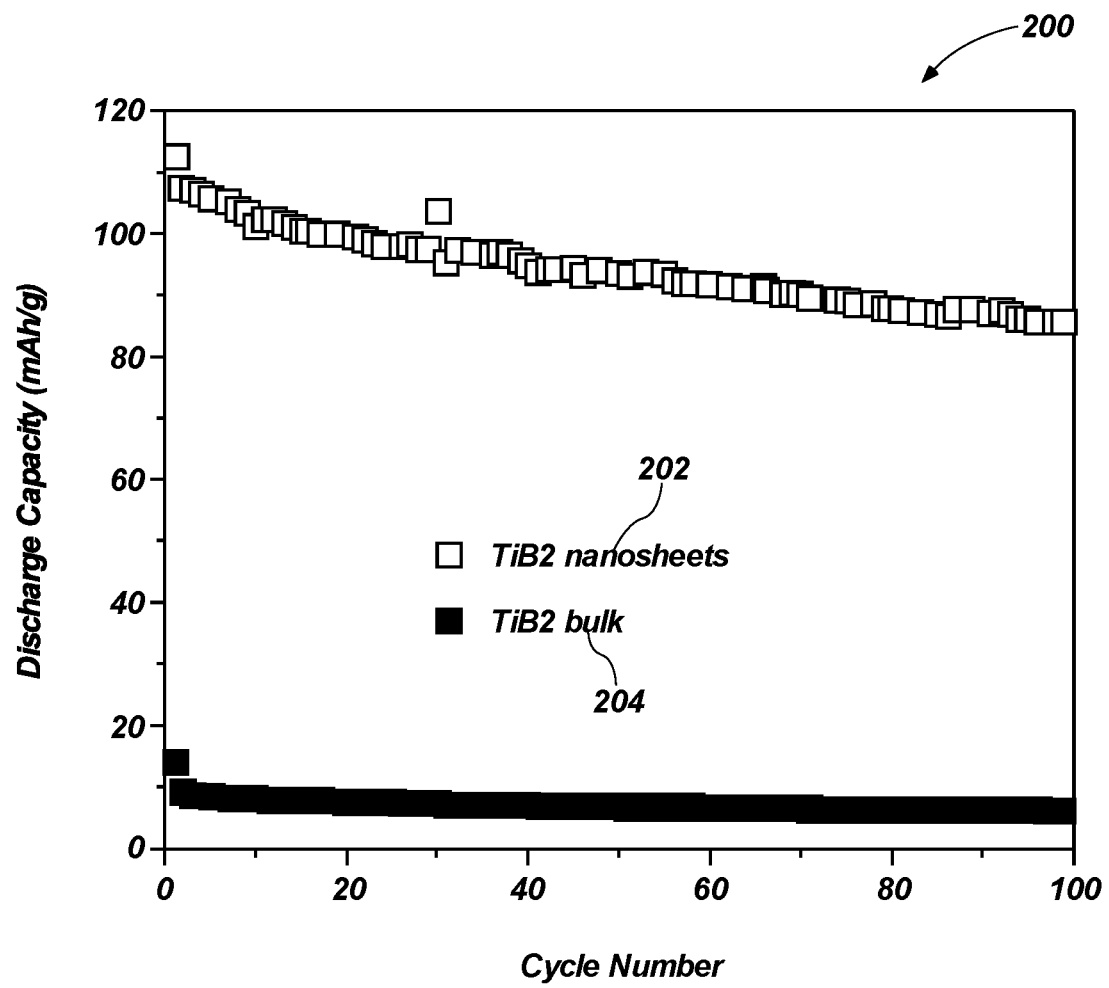
FIG. 2 shows a graph demonstrating comparisons of discharge capacities (i.e., specific energy) as a function of cycle numbers (e.g., full discharge and full recharge numbers) of energy storage devices according to one or more embodiments of the present disclosure.

FIG. 2 is a graph 200 showing comparisons of discharge capacities (i.e., specific energy) as a function of cycle numbers (e.g., full discharge and full recharge numbers) of energy storage devices according to one or more embodiments of the present disclosure. As shown in FIG. 2, a first energy storage device 202 includes an anode 102 comprising $TiB_2$ nanosheets, and a second energy storage device 204 includes an anode 102 comprising $TiB_2$ in bulk form, each energy storage device 202 and 204 respectively configured as described above in regard to FIGS. 1A and 1B. The first energy storage device 202, which utilizes $TiB_2$ nanoparticles, exhibits a capacity (e.g., specific energy, energy density) within a range of about 110 mAh/g to about 120 mAh/g at zero cycles. Furthermore, over about 100 cycles, the first energy storage device 202 exhibits a drop in capacity of between about 15% and about 25%.

In contrast, the second energy storage device 204, which utilizes $TiB_2$ in bulk form, exhibits a capacity (e.g., specific energy, energy density) within a range of about 16 mAh/g to about 18 mAh/g at zero cycles. Furthermore, over about 100 cycles, the second energy storage device 204 exhibits a drop in capacity of between about 35% and about 55%. As will be understood by one of ordinary skill in the art, the $TiB_2$ nanoparticles have a higher surface ratio due to the reduced particle size, and lithium-ion storage (e.g., capacity) in the anode 102 is surface dominant. Therefore, due to the increased surface area of the $TiB_2$ nanoparticles, the $TiB_2$ nanoparticles enable an increased faradaic reaction, which leads to an increased storage capacity. Accordingly, the higher surface ratio of the $TiB_2$ nanoparticles of the anode 102 of first energy storage device 202 enables a higher capacity and a higher retainment of capacity through multiple cycles. In view of the foregoing, the first energy storage device 202 of the present disclosure (e.g., $TiB_2$ nanoparticles) may provide between six and seven times more capacity than an anode 102 in a bulk form counterpart, as in second energy storage device 204. Additionally, the first energy storage device 202 of the present disclosure may maintain a capacity between 1.5 and four times better than the bulk form counterpart anode 102 of second energy storage device 204.

Figure 3:
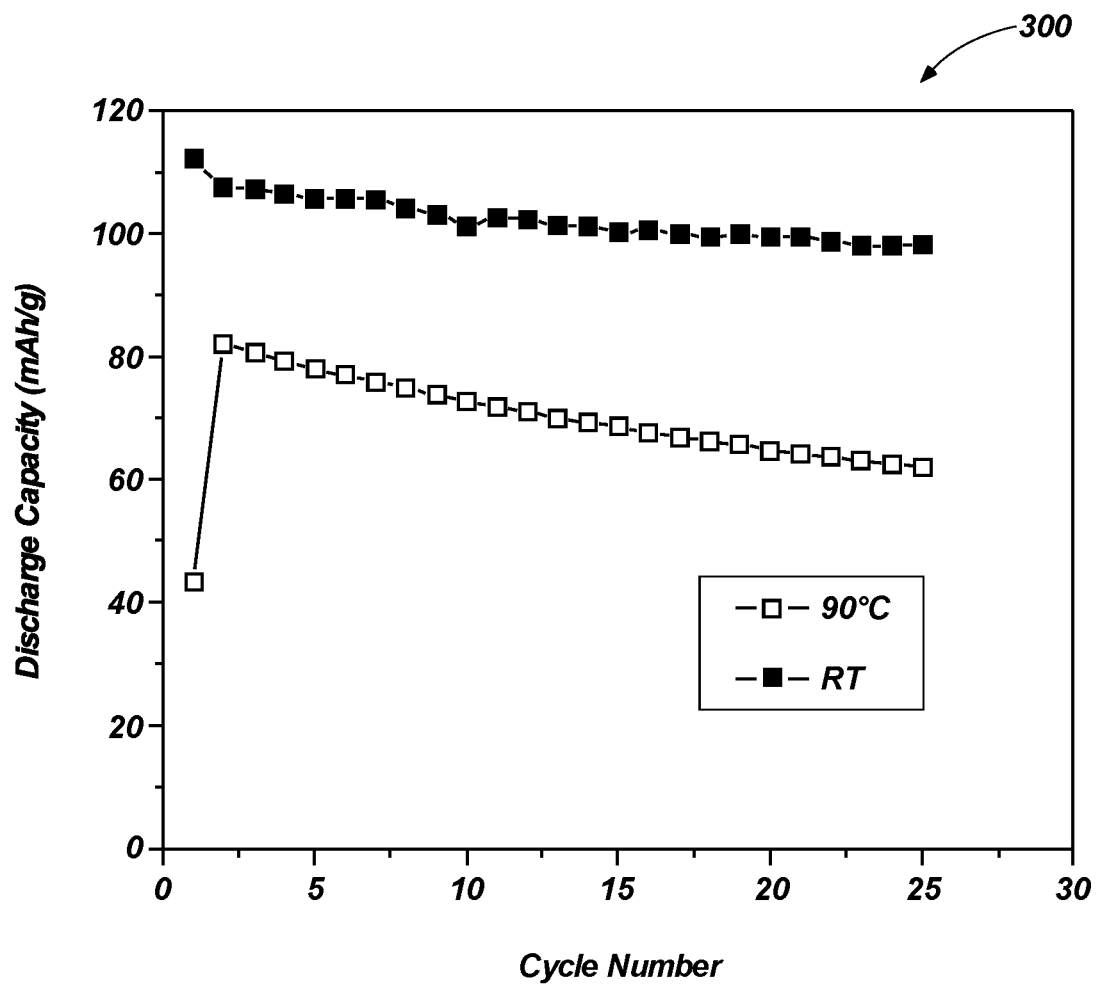
FIG. 3 shows a graph demonstrating a comparison of discharge capacities (i.e., specific energy) of energy storage devices of the present disclosure at about room temperature (i.e., 20° C.) and at about 90° C. according to one or more embodiments of the present disclosure.

FIG. 3 includes a graph 300 showing a comparison of discharge capacities (i.e., specific energy) of energy storage devices of the present disclosure at about room temperature (i.e., 20° C.) and at about 90° C. As shown, at room temperature and over a cycle count of about twenty-five, such an energy storage device exhibits a capacity (i.e., specific energy) between about 115 mAh/g and about 98 mAh/g. Additionally, at room temperature, such an energy storage device may exhibit a loss in capacity of between about 15% and about 20% over a cycle count of about twenty-five. For instance, at room temperature, such an energy storage device may exhibit a loss in capacity of about 18%.

Furthermore, at about 90° C. and over a cycle count of about twenty-five, such an energy storage device having an electrode (i.e., anode) comprising a metal diboride (e.g., $TiB_2$) or one of its transition metal derivatives exhibits a capacity (i.e., specific energy) between about 85 mAh/g and about 65 mAh/g. Additionally, at about 90° C., such an energy storage device may exhibit a loss in capacity of between about 18% and about 25% over a cycle count of about twenty-five. For instance, at about 90° C., such an energy storage device may exhibit a loss in capacity of about 21%. In some embodiments, such an energy storage device may exhibit relatively stable storage capacities up to about 90° C., about 110° C., about 120° C., or about 150° C.

In view of the foregoing, an energy storage device of the present disclosure may at least substantially maintain storage capacities and charging/discharging capabilities at relatively high temperatures. Accordingly, an energy storage device of the present disclosure may be more suitable for high temperature and high pressure environments. As a result, an energy storage device of the present disclosure may be depended upon to operate under critical conditions, such as, for example, in downhole conditions, on aerospace vehicles, and/or in underwater conditions.

Furthermore, under typical operating conditions (e.g., battery conditions) an energy storage device of the present disclosure may exhibit an electrochemical stability window between about 0 and about 5 V. As is known in the art, in regard to energy storage devices, the electrochemical stability window of an electrode (e.g., an anode or a cathode 104) is the voltage range between which the electrode is neither oxidized nor reduced.

Moreover, while a particular embodiment of energy storage device 100, referring again to FIGS. 1A and 1B is described herein as a lithium-ion battery and having an electrode (e.g., an anode 102) including a metal diboride, the disclosure is not so limited. Rather, the energy storage device 100 may include a lithium-ion capacitor. Furthermore, the lithium-ion capacitor may include one or more electrodes comprising any of the metal diborides described above. For instance, in some embodiments, the lithium-ion capacitor may include a cathode 104 at least partially comprising a metal diboride. In additional embodiments, the lithium-ion capacitor may include an anode 102 at least partially comprising a metal diboride and being pre-doped with lithium ions 110. For instance, the lithium-ion capacitor may include any of the lithium-ion capacitors described in, for example, U.S. Pat. No. 7,817,403, to Tasaki et al., and U.S. Pat. No. 9,129,756, to Gadkaree et al. with at least one electrode of the lithium capacitors comprising any of the metal diborides or transition metal derivatives described above. The disclosures of the foregoing references are incorporated in their entireties by reference herein.

Figure 4:
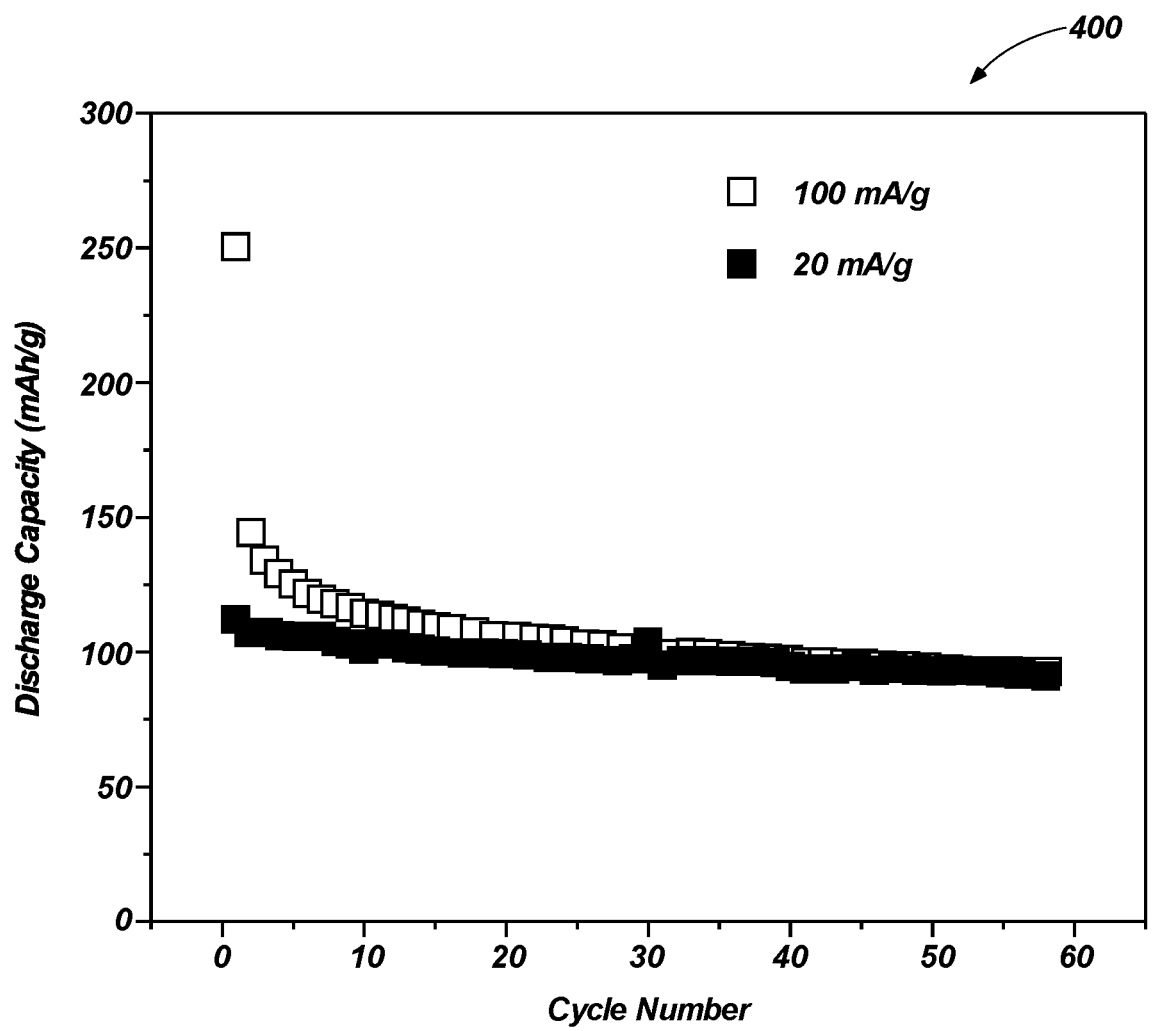
FIG. 4 includes a graph showing capacity of energy storage devices at varying discharging and charging rates according to one or more embodiments of the present disclosure.

FIG. 4 includes a graph 400 showing capacities of energy storage devices of the present disclosure at varying discharging and charging rates. As is shown in the graph 400, at charging/discharging rates of 100 mA/g and 20 mA/g, energy storage devices of the present disclosure at least substantially maintain a same storage capacity over sixty cycles. In view of the foregoing, an energy storage device of the present disclosure may be subjected to relatively high charging/discharging rates while still maintaining capacity.

Referring to FIGS. 1A-4 together, embodiments of the energy storage device 100 of the present disclosure may be advantageous over conventional energy storage devices and, in particular, conventional lithium-ion batteries. For example, as is known in the art, power density of conventional lithium-ion batteries is relatively low due to a relatively slow lithium-ion intercalation process in conventional anode materials (e.g., graphite). Furthermore, due to the low lithium-ion intercalation potential (~0.05 V) of conventional anode materials, the anode 102 forms a passivation layer referred to as a solid electrolyte interphase ("SEI"). Moreover, relatively slow lithium-ion conduction across the SEI lowers usable capacity of the lithium-ion battery when the lithium-ion battery is charged and/or discharged quickly. In contrast, as noted above, the metal diboride anode 102 of energy storage device 100 of the present disclosure exhibits a lithium-ion intercalation potential above 0.7 V, which is above the anodic electrolyte decomposite potential (~0.7 v). Thus, the metal diboride anode 102 of the energy storage device 100 of the present disclosure avoids formation of the SEI. As a result, the energy storage device 100 of the present disclosure at least substantially maintains its usable capacity even when charged and/or discharged quickly. Accordingly, as will be understood by one of ordinary skill in the art, by maintaining its usable capacity even when charged and/or discharged quickly, the energy storage device 100 of the present disclosure may provide a more reliable energy source in comparison to conventional lithium-ion batteries, which, in turn, may provide more reliable and safe operations when utilizing the energy source.

Furthermore, because the energy storage devices (e.g., lithium-ion battery and/or lithium-ion capacitor) of the present disclosure include a metal diboride anode 102, the energy storage devices can provide high energy density at high power densities (e.g., fast charging). Accordingly, the energy storage devices may provide more suitable energy sources for consumer electronics, medical devices, and military devices, where energy storage devices are require to operate at high current rates.

Figure 5:
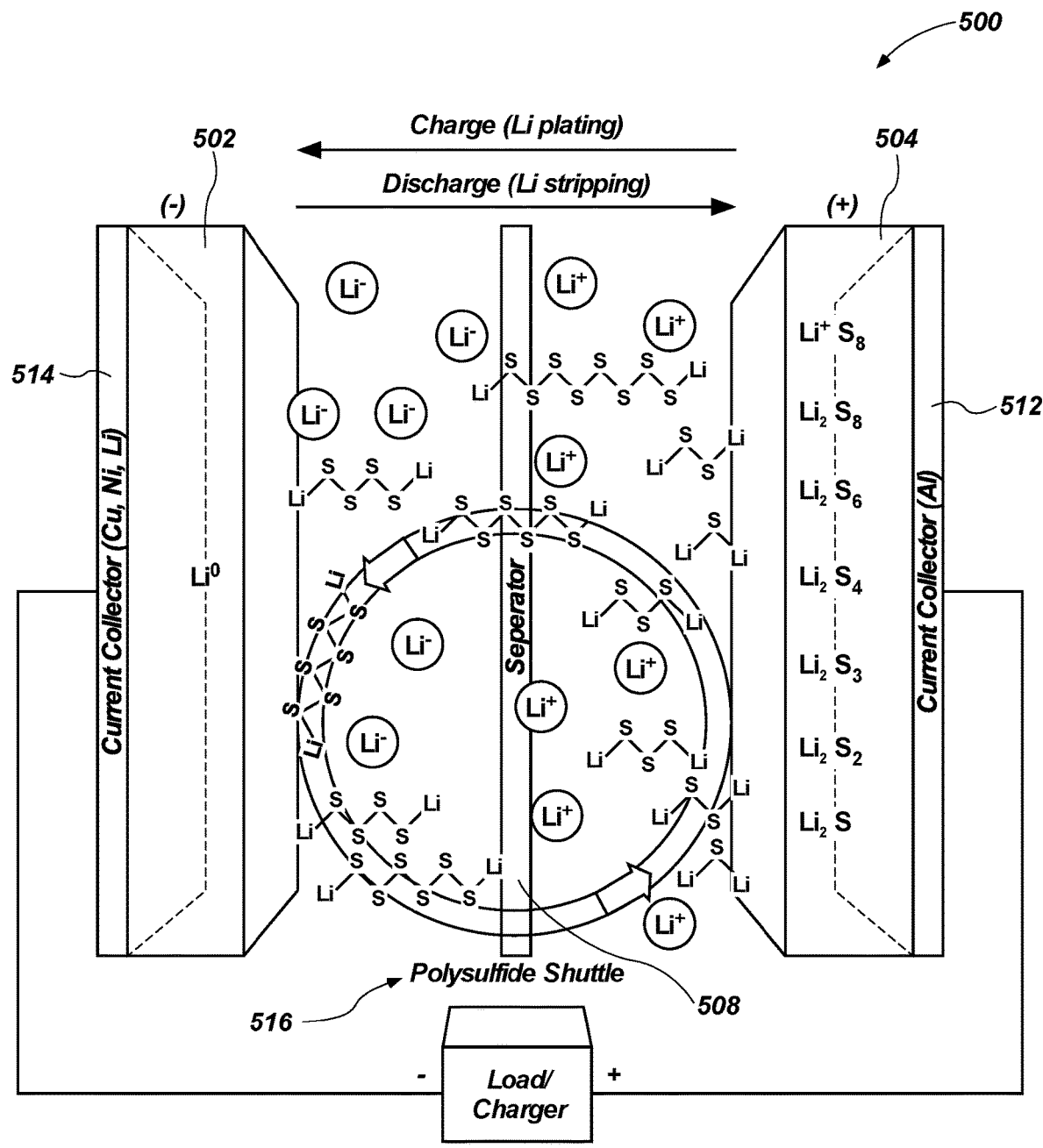
FIG. 5 shows a schematic representation of an energy storage device according to one or more embodiments of the present disclosure.

FIG. 5 shows an energy storage device 500 according to one or more embodiments of the present disclosure. The energy storage device 500 may include a cathode 504, an anode 502, a first current collector 512, a second current collector 514, a separator 508, and a polysulfide shuttle 516. The first current collector 512 may be adjacent to the cathode 504, and the second current collector 514 may be adjacent to the anode 502. The polysulfide shuttle 516 and separator 508 may be disposed between the cathode 504 and the anode 502. For example, the energy storage device 500 may include a lithium-sulfur battery and may be structured in any manner of lithium-sulfur batteries known in the art.

For instance, the energy storage device 500 may include any known lithium-sulfur battery known in the art. However, the cathode 504 of the energy storage device 500 may include a composite of materials that includes the highly conductive and polar-natured metal diborides discussed above in regard to FIGS. 1A-4. For example, the cathode 504 may include $MB_xO_y$ where M=Ti, Zr, Mg, Si, Mo, W, V, Mn; x=1 to 2 and y=0 to 1. As a non-limiting example, the cathode 504 of the energy storage device 500 may include $TiB_2$.

As is known in the art, applications of conventional lithium-sulfur batteries are impeded due to short life cycles and poor coulombic efficiency. The aforementioned shortcomings generally result from an insulating nature of sulfur (included in the cathode 504) and a shuttling effect of dissolved lithium polysulfide species, which poisons reactive lithium metal anodes of lithium-sulfur batteries. However, the highly conductive and polar-natured metal diborides described herein as additives to the cathode 504 of the energy storage device 500 suppresses dissolution of lithium polysulfide species. Accordingly, the highly conductive and polar-natured metal diborides described herein as additives to the cathode 504 of the energy storage device 500 increase a cycle life of the energy storage device 500 in comparison to conventional lithium-sulfur batteries. As a result, the energy storage device 500 of the present disclosure may be more appropriate for electric and hybrid electric vehicles in comparison to conventional lithium-sulfur batteries.

In additional embodiments, the energy storage device 500 may include any alkali-metal sulfur battery known in the art with the highly conductive and polar-natured metal diborides described herein as additives to the cathode 504 of the energy storage device 500.

The disclosure further includes the following embodiments.

Embodiment 1

An energy storage device, comprising: a first electrode comprising lithium; a second electrode comprising a metal diboride; an electrolyte disposed between the first electrode and the second electrode and providing a conductive pathway for lithium ions to move to and from the first electrode and the second electrode; and a separator within the electrolyte and between the first electrode and the second electrode.

Embodiment 2

The energy storage device of Embodiment 1, wherein the metal diboride comprises titanium diboride.

Embodiment 3

The energy storage device of Embodiments 1 and 2, wherein the energy storage device exhibits a lithium intercalation potential above anodic electrolyte decomposite potential.

Embodiment 4

The energy storage device of Embodiments 1 through 3, wherein the metal diboride comprises $MB_xO_y$ where M=Ti, Zr, Mg, Si, Mo, W, V, Mn; x=1 to 2 and y=0 to 1.

Embodiment 5

The energy storage device of Embodiments 1 through 4, wherein the first electrode comprises a cathode and wherein the second electrode comprises an anode.

Embodiment 6

The energy storage device of Embodiments 1 through 5, wherein the energy storage device comprises a lithium-ion battery.

Embodiment 7

The energy storage device of Embodiments 1 through 4, wherein the energy storage device comprises a lithium-ion capacitor.

Embodiment 8

An energy storage device, comprising: a first electrode; a second electrode comprising a metal diboride; an electrolyte disposed between the first electrode and the second electrode and providing a conductive pathway for ions to move to and from the first electrode and the second electrode; and a separator within the electrolyte and between the first electrode and the second electrode.

Embodiment 9

The energy storage device of Embodiment 8, wherein the second electrode comprises nanoparticles of metal diboride.

Embodiment 10

The energy storage device of Embodiments 8 and 9, wherein the second electrode comprises a composite comprising graphite and the metal diboride.

Embodiment 11

The energy storage device of Embodiments 8 through 10, wherein the energy storage device exhibits a capacity within a range of about 110 mAh/g to about 120 mAh/g at zero cycles.

Embodiment 12

The energy storage device of Embodiments 8 through 11, wherein the energy storage device exhibits a drop in capacity of between about 15% and about 25% over 100 cycles.

Embodiment 13

The energy storage device of Embodiments 8 through 12, wherein the second electrode exhibits a conductivity within a range of about $6.667 \times 10^6$ S/ms to about $1.11 \times 10^7$ S/m.

Embodiment 14

The energy storage device of Embodiments 8 through 13, wherein the first electrode comprises a material selected from a group consisting of lithium, sodium, calcium, or magnesium.

Embodiment 15

The energy storage device of Embodiments 8 through 14, wherein the first electrode comprises an anode and wherein the second electrode comprises a cathode.

Embodiment 16

The energy storage device of Embodiments 8 through 15, wherein the metal diboride comprises titanium diboride.

Embodiment 17

The energy storage device of Embodiments 8 through 16, wherein the energy storage device exhibits a lithium intercalation potential above anodic electrolyte decomposite potential.

Embodiment 18

The energy storage device of Embodiments 8 through 17, wherein the second electrode comprises $MB_xO_y$, where M=Ti, Zr, Mg, Si, Mo, W, V, Mn; x=1 to 2 and y=0 to 1.

Embodiment 19

A method of forming an energy storage device, comprising: forming a first electrode to comprise lithium; forming a second electrode to comprise a metal diboride; disposing an electrolyte between the first electrode and the second electrode, the electrolyte providing a conductive pathway for lithium ions to move to and from the first electrode and the second electrode; and disposing a separator within the electrolyte and between the first electrode and the second electrode.

Embodiment 20

The method of Embodiment 19, wherein forming the second electrode to comprise a metal diboride comprises forming the second electrode to comprise comprises titanium diboride.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. An energy storage device, comprising:
   a first electrode comprising lithium;
   a second electrode consisting essentially of nanoparticles of a metal diboride;
   an electrolyte disposed between the first electrode and the second electrode and providing a conductive pathway for lithium ions to move to and from the first electrode and the second electrode; and
   a separator within the electrolyte and between the first electrode and the second electrode.

2. The energy storage device of claim 1, wherein the metal diboride consists essentially of titanium diboride.

3. The energy storage device of claim 1, wherein the energy storage device exhibits a lithium intercalation potential above anodic electrolyte decomposite potential.

4. The energy storage device of claim 1, wherein the metal diboride consists essentially of $MB_2$ where M=Ti, Zr, Mg, Si, Mo, W, V, Mn.

5. The energy storage device of claim 1, wherein the first electrode comprises a cathode and wherein the second electrode comprises an anode.

6. The energy storage device of claim 1, wherein the energy storage device comprises a lithium-ion battery.

7. The energy storage device of claim 1, wherein the energy storage device comprises a lithium-ion capacitor.

8. An energy storage device, comprising:
   a first electrode;
   a second electrode consisting essentially of nanoparticles of a metal diboride;

an electrolyte disposed between the first electrode and the second electrode and providing a conductive pathway for ions to move to and from the first electrode and the second electrode; and a separator within the electrolyte and between the first electrode and the second electrode.

9. The energy storage device of claim 8, wherein the energy storage device exhibits a capacity within a range of about 110 mAh/g to about 120 mAh/g at zero cycles.

10. The energy storage device of claim 8, wherein the energy storage device exhibits a drop in capacity of between about 15% and about 25% over 100 cycles.

11. The energy storage device of claim 8, wherein the second electrode exhibits a conductivity within a range of about $6.667 \times 10^6$ S/m to about $1.11 \times 10^7$ S/m.

12. The energy storage device of claim 8, wherein the first electrode comprises a material selected from a group consisting of lithium, sodium, calcium, or magnesium.

13. The energy storage device of claim 8, wherein the first electrode comprises an anode and wherein the second electrode comprises a cathode.

14. The energy storage device of claim 8, wherein the metal diboride consists essentially of titanium diboride.

15. The energy storage device of claim 8, wherein the energy storage device exhibits a lithium intercalation potential above anodic electrolyte decomposite potential.

16. The energy storage device of claim 8, wherein the metal diboride consists essentially of $MB_2$ where M=Ti, Zr, Mg, Si, Mo, W, V, Mn.

17. A method of forming an energy storage device, comprising:

forming a first electrode to comprise lithium;

forming a second electrode to consist essentially of nanoparticles of a metal diboride;

disposing an electrolyte between the first electrode and the second electrode, the electrolyte providing a conductive pathway for lithium ions to move to and from the first electrode and the second electrode; and disposing a separator within the electrolyte and between the first electrode and the second electrode.

18. The method of claim 17, wherein forming the second electrode to consist essentially of a metal diboride comprises forming the second electrode to consist essentially of titanium diboride.

* * * * *